United States Patent Office 3,343,343
Patented Sept. 26, 1967

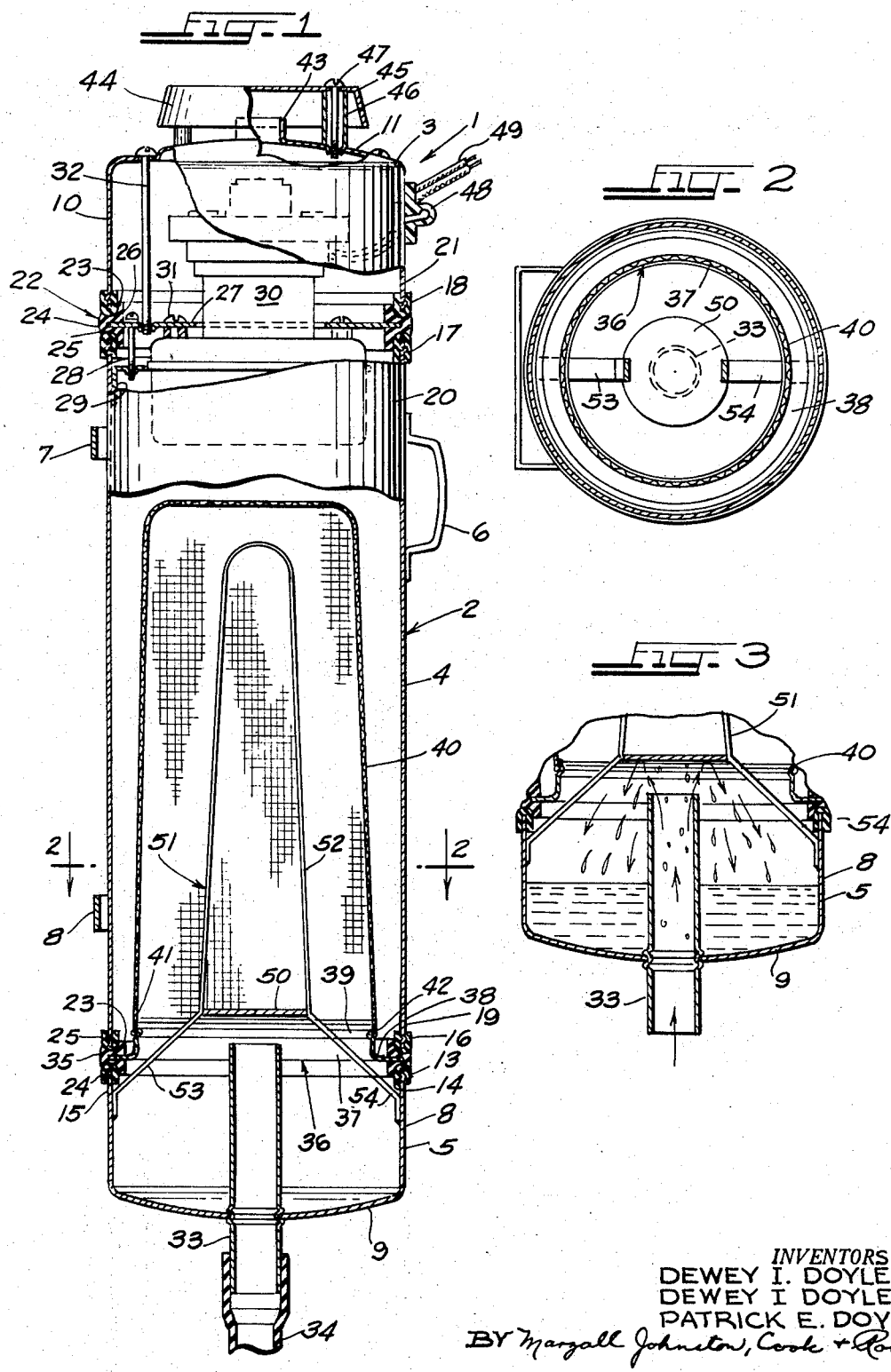

3,343,343
VACUUM CLEANER UNITS
Dewey I. Doyle, Dewey I. Doyle, Jr., and Patrick E. Doyle, Grand Rapids, Mich., assignors to Doyle Vacuum Cleaner Company, Grand Rapids, Mich., a corporation of Michigan
Filed May 28, 1962, Ser. No. 198,155
1 Claim. (Cl. 55—320)

This invention relates to vacuum cleaner units.

It is a primary object of the present invention to afford a novel vacuum cleaner unit.

Vacuum cleaner units have been hereotfore known in the art, but such units as have been heretofore known have had several inherent disadvantages such as, for example, embodying filters so constituted and arranged that the dirt and other particles trapped by the filters are retained thereon by gravity and rapidly reduce the air flow through the filters during the operation of the units; being so constituted and arranged that the filters thereof were subjected to air blast damage caused by the air passing through the unit impinging directly against the filters; being so constituted and arranged that the filters thereof were subjected to being punctured and damaged by the impingement thereagainst of foreign materials, and particularly metal objects such as pins, and the like, picked up by the units during the operation thereof; not effectively removing moisture picked up with the air passing through the unit; being large and cumbersome in size; and being unreliable and inefficient in operation, or the like. It is an important object of the present invention to overcome such disadvantages.

Another object of the present invention is to afford a novel vacuum cleaner unit wherein the air passing therethrough enters at the bottom of the unit and discharges from the top thereof.

Another object is to afford a novel vacuum cleaner of the aforementioned type which embodies a filter element constituted and arranged in a novel and expeditious manner for effectively filtering dirt and other foreign material from the air passing through the uint.

Yet another object is to afford a novel vacuum cleaner unit of the aforementioned type embodying a recovery chamber constituted and arranged in a novel and expeditious manner for collecting or catching the foreign material separated from the air passing through the unit.

A further object is to afford a novel vacuum cleaner unit of the aforementioned type which embodies a recovery chamber which may contain water or other suitable liquids therein.

Another object is to afford a novel vacuum cleaner unit of the aforementioned type which embodies a recovery chamber in the lower end portion thereof and wherein the air and other material entering the unit are deflected downwardly toward the recovery chamber in a novel and expeditious manner to effectively separate the foreign material from the air passing through the unit and cause such foreign material thereby separated to be collected in the recovery chamber.

Another object is to afford a novel vacuum cleaner unit of the aforementioned type wherein the power unit for causing the air to flow through the cleaner unit may be mounted in the upper end portion thereof in a novel and expeditious manner.

Another object is to afford a novel vacuum cleaner unit of the aforementioned type wherein the recovery chamber is conveniently located for clean-out purposes.

Other and further objects of the present invention will be apparent from the following description and claims and are illustrated in the accompanying drawings which, by way of illustration, show a preferred embodiment of the present invention and the princples thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a longitudinal view, partially in elevation and partially in section, of a vacuum cleaner unit embodying the principles of the present invention;

FIG. 2 is a transverse sectional view taken substantially along the line 2—2 in FIG. 1; and FIG. 3 is a fragmentary, detail sectional view of a portion of the unit shown in FIG. 1.

A vacuum cleaner unit 1, embodying the principles of the present invention, is shown in the drawings to illustrate the preferred embodiment of the present invention. The vacuum cleaner 1 includes a substantially straight, elongated, cylindrical-shaped casing or housing 2, which is preferably substantially circular in transverse cross section. The casing 2 may be made of any suitable material such as, for example, stainless steel, aluminum, or the like, and includes an upper end portion 3, an intermediate portion 4, and a lower end portion 5. A handle 6 is secured to and extends outwardly from the intermediate portion 4 and affords a readily accessible handle for lifting or carrying the unit 1. Two identical hanger straps 7 and 8 are secured to the upper and lower end portions of the intermediate portion 4 of the casing 2, FIGS. 1 and 2, and afford hanger members by which the unit 1 may be suspended from, or otherwise secured to, a suitable supporting member such as, for example, a stand or a dolly, or the like, not shown.

The vacuum cleaner unit 1 is intended for use with the casing 2 disposed in upright position, with the lower end portion 5 disposed at the bottom thereof and the upper end portion 3 disposed at the top thereof, as shown in FIG. 1, with the lower end portion 5 affording a recovery chamber for collecting foreign material picked up by the vacuum cleaner unit 1. The lower end portion 5 is substantially cup-shaped, being open at the top and having an annular side wall 8 projecting upwardly from the outer peripheral edge of a bottom wall 9. The upper end portion 3 is of substantially inverted cup-shape, having an annular side wall 10 projecting downwardly from the outer peripheral edge of a top wall 11. The intermediate portion 4 of the casing 2 is tubular in shape, being of substantially greater length than the upper and lower end portions 3 and 5, but being of the same transverse cross sectional size and shape as the upper and lower end portions 3 and 5.

A resilient annular gasket 13, made of suitable material such as, for example, rubber or neoprene, having a slit 14 in one axial face thereof is mounted on the upper edge 15 of the lower end portion 5 of the casing 2, with the upper edge 15 disposed in the slit 14. Three other resilient gaskets 16, 17, and 18, which are identical to the gasket 13, are mounted on the lower edge portion 19 of the intermediate portion 4, the upper edge portion 20 of the intermediate portion 4, and the lower edge portion 21 of the upper end portion 3, respectively, FIG. 1.

Another resilient, annular gasket 22, which may be made of any suitable material such as, for example, the aforementioned rubber or neoprene, or the like, is mounted on the upper end portion 20 of the intermediate portion 4 of the casing 2, FIG. 1. The gasket 22 is substantially T-shaped in transverse cross section with the cross bar portion 23 of the T-shaped gasket 22 disposed in substantially vertical position inwardly of the gasket 17, and with the body portion 24 of the T-shaped gasket 22 projecting radially outwardly from the cross bar portion 23 and resting on top of the gasket 17, FIG. 1. When the upper end portion 3 is disposed in normal operative position on the intermediate portion 4 of the casing 2, the gasket 18 on the upper end portion 3 is disposed radially outwardly of the upper end portion of the cross bar 23 of the gasket 22 and rests on top of the body portion 24 of the gasket 22, FIG. 1.

The gasket 22 has a continuous, radially inwardly opening, annular slot 25 in its inner face. The gasket 22 is mounted on the outer peripheral edge portion 26 of a mounting ring 27, the outer edge portion 26 of the ring 27 being disposed in the slot 25 to thereby support the mounting ring 27 from the gasket 22 and from the upper end portion 20 of the intermediate portion 4 of the casing 2, FIG. 1. Hold-down bolts 28 extend downwardly through the outer peripheral edge portion of the mounting ring inwardly of the gasket 22, and are threaded into spaced brackets 29 attached to and projecting inwardly from the upper end portion 20 of the intermediate portion 4 of the casing 2 to thereby releasably secure the gasket 22 and the mounting ring 27 on the upper end portion 20 of the intermediate portion 4.

A combined blower and motor unit 30 is secured to the mounting ring 27 by screws or bolts 31, and is supported by the mounting ring 27 in such position that the lower end portion of the unit 30 is disposed in the upper end portion 20 of the intermediate portion 4 of the casing 2, and the upper end portion of the combined blower and motor unit 30 projects upwardly therefrom into position to be covered by the upper end portion 3 of the casing 2 when the upper end portion 3 is disposed in normal operative position on the intermediate portion 4, FIG. 1. Hold-down screws 32 extend downwardly through the outer peripheral edge portion of the top wall 11 of the upper end portion 3 of the casing 2 and are threaded into the mounting ring 27 to thereby releasably secure the upper end portion 3 of the casing 2 to the intermediate portion 4.

An inlet pipe or nozzle 33 extends through the radial center of the bottom wall 9 of the lower end portion 5 of the casing 2, and projects upwardly and downwardly therefrom. The nozzle 33 terminates at its upper end in substantially uniplanar relation to the upper edge of the lower end portion 5, and projects downwardly from the bottom wall 9 a sufficient distance to afford a connector for the reception of one end of a vacuum cleaner hose 34, FIG. 1. The nozzle 33 is sealed to the adjacent portions of the bottom wall 9 of the lower end portion 5 by suitable means such as, for example, welding, or the like, to afford a liquid-type connection between the nozzle 33 and the lower end portion 5 of the casing 2 for a purpose which will be discussed in greater detail presently.

Another gasket 35, which is identical in construction to the gasket 22, is mounted on the lower end portion 19 of the intermediate portion 4 of the casing 2 with the upper end portion of the cross bar portion 23 of the gasket 35 disposed radially inwardly of the intermediate portion 4, and with the gasket 16 on the lower edge of the intermediate portion 4 resting on top of the body portion 24 of the gasket 35. The gasket 35 rests on top of the gasket 13 on the upper edge of the lower end portion 5 of the casing 2, with the lower end portion of the cross bar 23 disposed radially inwardly of the gasket 13.

Another mounting ring 36 having an annular body portion 37, which is smaller in diameter than the casing 2, is disposed in the casing 2. The ring 36 includes an annular flange 38, which projects radially outwardly from the lower edge portion of the body portion 37 thereof, and the flange 38 is disposed in the slot 25 of the gasket 35 to thereby support the ring 36 from the lower end portion of the intermediate portion 4 of the casing 2. The body portion 37 of the mounting ring 36 has a radially outwardly opening annular groove or recess 39 extending around the outer periphery therof, and a filter bag 40 having an open lower end portion 41 is secured to the mounting ring 36 at the lower end portion of the bag 40 by a suitable fastening member, such as a snap ring 42 disposed in the groove 39, the lower end portion 41 of the bag 40 being clampingly engaged between the snap ring 42 and the body portion 37 of the ring 36.

The bag 40 may be made of any suitable material such as, for example, cloth, or the like, and is preferably substantially cylindrical-shaped, with a transverse cross sectional size which is substantially less than the transverse cross sectional size of the casing 2.

An outlet nozzle 43 is mounted in, and projects upwardly from the radial center of the top wall 11 of the upper end portion 3, FIG. 1, and terminates at its upper end in downwardly spaced relation to the top wall 44 of a substantially inverted cup-shaped cap member 45 which is mounted on top of spacer members 46 resting on the upper end portion 3 of the casing 2. The cap member 45 is releasably secured to the upper end portion 3 by bolts 47, which project downwardly through the cap member 45 and the spacer members 46 and are threaded into the top wall 11 of the upper end portion 3, FIG. 1. The cap member 45 is spaced upwardly from the top wall 11 to permit air flowing outwardly from the outlet nozzle 43 to flow radially outwardly between the cap member 45 and the upper end portion 3 of the casing 2 during operation of the vacuum cleaner unit 1.

The combined blower and motor unit 30 is connected through a suitable switch 48 to suitable conductors 49, which may be connected to a suitable source of electric power, such as, for example, the usual wall sockets, not shown, in a house or office building, or the like. In the operation of the vacuum cleaner unit 1, when the conductors 49 are connected to the aforementioned source of electric power, and the switch 48 is in "on" position, the combined blower and motor unit 30 is thereby energized to cause air to be drawn inwardly through the hose 34 and the inlet nozzle 33 into the lower end portion 5 of the casing 2, from whence the air flows upwardly through the intermediate portion 4 and the upper end portion 3 of the casing 2 and is discharged outwardly through the outlet nozzle 43 to the atmosphere.

A deflector plate 50 is mounted on a suitable supporting bracket 51 vertically above the inlet nozzle 33 for a purpose which will be discussed in greater detail presently. The supporting bracket 51 is of a substantially downwardly opening, hair-pin shape, having a substantially inverted U-shaped central body portion 52 from the opposite sides of which two legs 53 and 54 project downwardly and outwardly, FIG. 1. The lower end portions of the legs 53 and 54 are secured by suitable means, such as welding, to the inner face of the side wall 8 of the lower end portion 5 of the casing 2 at diametrically opposed positions on the side wall 8.

The inverted U-shaped body portion 52 of the supporting bracket 51 projects upwardly from the upper ends of legs 53 and 54 in inwardly spaced relation to the side walls of the casing 2. The supporting bracket 51 is of such vertical length that it projects upwardly into the intermediate portion 4 of the assembled casing 5 into position wherein it terminates a short distance below the upper end of the filter bag 40 when the latter is in fully extended position, FIG. 1. With the supporting bracket 51 thus constituted and arranged in the casing 2, when the filter bag 40 is not in fully extended position, such as, for example, when the vacuum cleaner unit 1 is not in operation, so that air is not passing upwardly through the filter bag 40, the supporting bracket 51 affords a support for the bag 40 which is effective to support the latter in substantially fully extended position. With this construction, the bag 40 is at all times prevented from falling down into the recovery chamber afforded by the lower end portion 5 of the casing 2, and, also, is maintained in such extended position that foreign material such as lint, dirt, or the like, trapped by the bag 40, and which may accumulate on the inner face of the bag 40 during operation of the vacuum cleaner unit 1, may fall downwardly into the lower end portion 5 of the casing 2 when the unit 1 is not operating to thereby keep the bag 40 relatively free of any substantial accumulation of such foreign material.

The deflector plate 50 is preferably flat and circular in shape, and is preferably directly vertically aligned with the inlet nozzle 33, as shown in FIGS. 1 and 2. The plate 50 is of substantially smaller diameter than the body portion 39 of the mounting ring 36, and is disposed in the lower end portion 19 of the intermediate portion 4 of the casing 2 closely adjacent to the plane of the upper edge of the mounting ring 36, relatively close to the upper end of the nozzle 33.

With this construction of the vacuum cleaner unit 1, when the latter is in operation and air is being drawn upwardly through the hose 34 and the nozzle 33 into the casing 2, the air and entrained foreign material such as, for example, dirt, and the like, discharged from the nozzle 33 impinges directly against the lower face of the deflector plate 50. This causes the air and the entrained foreign material to be deflected downwardly toward the bottom of the casing 2, and, the casing 2 being of substantially larger diameter than the diameter of the nozzle 33, the expansion of the air in the casing 2 causes a sharp reduction in the velocity of the air and foreign material. As a result, the foreign material, because of its weight, tends to fall downwardly into the lower end portion 5 of the casing 2, and to remain therein. The air, after being deflected downwardly by the deflector plate 50 again moves upwardly and passes upwardly through the filter bag 40 and is discharged by the combined blower and motor unit 30 outwardly through the nozzle 33 to the atmosphere. The passage of the air through the filter bag 40 completes the removal of foreign material therefrom.

It will be seen that with this construction, moisture entrained with the air being drawn into the casing 2 through the nozzle 33 tends to fall into the lower end portion 5 of the casing 2 when directed downwardly by the deflector plate 50. Also, any dirt, such as, lint, or the like, which may be trapped on the inner face of the filter bag 40, tends to fall downwardly from the filter bag 40, when the vacuum cleaner unit 1 is shut off so that it tends to maintain a filter bag 40 free from any substantial accumulation of such foreign material and, therefore, retains efficient operation of the vacuum cleaner unit 1 for prolonged periods of time.

If desired, a supply of suitable liquid, such as, for example, water may be placed in the bottom of the lower end portion 5 of the casing 2 to assist in trapping foreign material deflected downwardly by the deflector plate 50 into the lower end portion 5.

The intermediate portion 4 and the lower portion 5 of the casing 2 preferably fit on the gasket 35 with a relatively snug friction fit. If desired, clamps, or the like, not shown, may be afforded on the casing 2 for affording additional retaining means for holding the intermediate portion 4 and the lower end portion 5 in assembled position.

It will be seen that with the casing 2 disposed in upright operating position, the lower end portion 5 is disposed in readily accessible position so that an operator may quickly and easily remove the lower end portion 5 from the casing 2 for the purpose of cleaning out any accumulation of dirt and any other foreign material in the lower end portion 5.

Also, it will be seen that with the novel vacuum cleaner unit constructed in the aforementioned manner, the air discharged from the nozzle 33 is prevented from directly impinging against the filter bag 40, as is any foreign material entrained in the air. This, it will be seen, is effective to prevent the bag 40 from suffering blast damage as a result of the direct impingement of the air or entrained foreign material thereagainst, and this is particularly important when relatively hard or sharp foreign material, such as, for example, pins, paper clips, thumbtacks, pieces of glass, and the like, are picked up by the vacuum cleaner unit 1.

From the foregoing, it will be seen that we have afforded a novel vacuum cleaner unit of the type wherein the air therethrough is fed into the lower end portion thereof and discharged from the upper end portion thereof.

Also, it will be seen that we have afforded a novel vacuum cleaner unit wherein the filter unit thereof is effectively protected against blast damage, and the like.

In addition, it will be seen that we have afforded a novel vacuum cleaner unit wherein the foreign material entrained in the air passing therethrough is separated from the air in a novel and expeditious manner.

Also, it will be seen that we have afforded a novel vacuum cleaner unit wherein the foreign material filtered from the air passing through the filter unit tends to fall by gravity downwardly from the filter unit into the recovery chamber of the vacuum cleaner unit to thereby tend to keep the filter unit free from large accumulations of such foreign material.

Also, it will be seen that we have afforded a novel vacuum cleaner unit which is effective to separate entrained moisture from the air prior to the passage of the air to the filter of the unit.

In addition, it will be seen that we have afforded a novel vacuum cleaner unit which is practical and efficient in operation and may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claim.

We claim:

A vacuum cleaner unit comprising:
(a) a casing having a lower portion, an upper portion, and an intermediate portion disposed between said upper and lower portions, with said lower portion removably mounted on the lower end of said intermediate portion in position to afford a recovery chamber,
(b) said casing having an air outlet in said upper portion,
(c) an air inlet nozzle projecting upwardly through said lower portion and terminating at its upper end substantially in uniplanar relation to the junction of said lower portion and said intermediate portion,
(d) means for drawing air into said casing through said nozzle and discharging said air from said casing through said outlet,
(e) a filter bag removably mounted on the bottom edge portion of said intermediate portion and extending upwardly therefrom into said casing in such position that air flowing from said nozzle to said outlet must pass through said bag,
(f) said bag being open at the bottom and being removable from said casing through the bottom of said intermediate portion when said lower portion of said casing is removed from said intermediate portion,
(g) a baffle partially filling said casing, (h) said baffle being disposed in the lower portion of said intermediate portion above said nozzle in such position that all foreign material entrained in the air flowing upwardly from said nozzle impinges against said baffle and is deflected downwardly thereby out of contact with said bag, and (i) means mounted on said baffle and projecting upwardly into said bag for supporting the latter.

References Cited

UNITED STATES PATENTS

| | | | |
|---|---|---|---|
| 1,782,640 | 11/1930 | Wenner-Gren | 55—472 |
| 2,030,367 | 2/1936 | Grave | 15—327 X |
| 2,346,339 | 4/1944 | Vose | 55—465 X |

HARRY B. THORNTON, *Primary Examiner.*